Oct. 5, 1926.
B. S. FERGUSON
BRACE FOR VEHICLE AXLES
Filed June 22, 1925
1,602,349
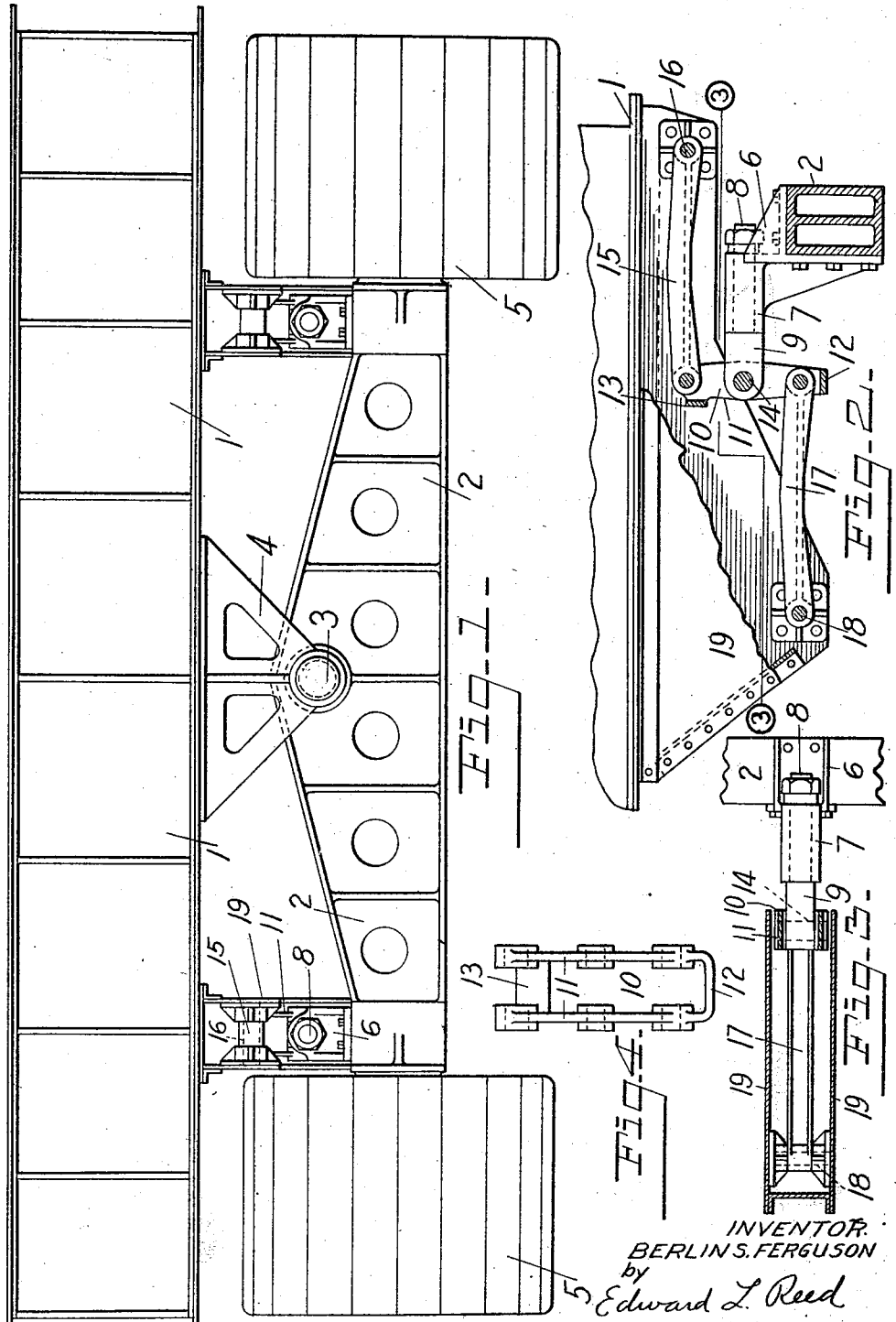
INVENTOR.
BERLIN S. FERGUSON
by Edward L. Reed
his ATTORNEY.

Patented Oct. 5, 1926.

1,602,349

UNITED STATES PATENT OFFICE.

BERLIN S. FERGUSON, OF MARION, OHIO, ASSIGNOR TO THE MARION STEAM SHOVEL COMPANY, OF MARION, OHIO, A CORPORATION OF OHIO.

BRACE FOR VEHICLE AXLES.

Application filed June 22, 1925. Serial No. 38,779.

This invention relates to braces for vehicle axles and more particularly to means for bracing the axles of machines equipped with crawling traction mechanism.

In machines equipped with crawling traction mechanism the front axle is usually mounted for movement about a transverse horizontal axis to permit the traction devices of the respective ends thereof to rise and fall as they move over ground that is irregular in contour. This axle is not usually used as a steering axle and is therefore not movable about a vertical axis. The end portions thereof are, however, subjected to severe fore and aft strains as the machine is forced forward over the ground and these strains tend to twist the axle about a vertical axis and are injurious to the axle and to the connections between the same and the main frame.

One object of the present invention is to provide means for bracing the end portions of the axle rigidly against fore and aft movement without interfering with the free vertical movement thereof.

A further object of the invention is to provide a bracing device of this character which will be of a very strong durable character and which will be simple in its construction and inexpensive to manufacture and install.

Other objects of the invention will appear as the device is described in detail.

In the accompanying drawings Fig. 1 is a front elevation of a portion of an excavating machine showing my invention applied thereto; Fig. 2 is a side elevation of a portion of said machine, broken away to show the brace in elevation; Fig. 3 is a section taken on the line 3—3 of Fig. 2; and Fig. 4 is a detail view of the cross head or connecting member.

In these drawings I have illustrated one embodiment of my invention and have shown the same as applied to an excavating machine of a well known type and comprising a base 1 and a front axle 2, the front axle being pivotally mounted at 3 on a bracket 4 secured to the main frame, or base 1. At each end the axle is supported on crawling traction devices 5 of a well-known character. It will be noted that the axle moves about a horizontal transverse axis to permit the traction devices to rise and fall but that it has no movement about a vertical axis. In order to brace the end portions of the axle against strains which might tend to move them forwardly or rearwardly with relation to the base or main frame 1, I have provided a bracing device comprising a part connected with the end portion of the axle and which is so connected with the base that it will have free vertical movement to permit the rise and fall of the end portion of the axle but will be held against forward or rearward movement. As here shown, the axle 2 has secured thereto, near each end thereof, a bracket 6 which is provided with means for connecting the same with the cross head or connecting member of the brace. Preferably, the bracket has a horizontal bearing portion 7 extending transversely to the axle and in this bearing is mounted a bolt 8, the rear end of which is provided with a head 9 by means of which it may be connected with the cross head. The cross head is here shown in the form of an elongated member or lever 10 and may, if desired, comprise two parallel parts or side members 11 connected one to the other at their lower ends with a transverse portion 12 and at their upper ends with a transverse portion 13, the whole structure being preferably formed integral. The head 9 of the bolt 8 extends between the two parts of the cross head 10 and is pivotally connected thereto at a point between the ends thereof by means of a pivot pin 14, so that the point of connection between the cross head and the bolt is supported at all times at a fixed distance from the axle 2. Pivotally connected with the upper end of the cross head 10 is a link 15 which extends forwardly therefrom and is pivotally mounted at 16 on an axis fixed with relation to the main frame 1 and, as here shown, the pivot pin is mounted in a part rigidly secured to the main frame. Connected with the lower end of the cross head is a second link 17 which is pivotally connected at its rear end on an axis fixed with relation to the main frame, as shown at 18. In the present construction the pivot pin is carried by a bracket 19 which is here shown as comprising parallel members between which the end of the link is supported. These parallel members of the bracket also enclose the upper link 15. The links 15 and 17 are of substantially the same length and they are pivotally connected with the cross head 10 at points spaced substantially equal distances from the axis of the pin 14 which connects the cross head with the axle. Consequently this cross head is free to move vertically with the axle and when vertical movement is imparted thereto the ends of the cross head will be moved forwardly or rearwardly by the movement of the links about their fixed axes but the point of connection of the cross head with the axle, that is, the pivot pin 14, will remain substantially in a fixed vertical plane. The cross head is held rigidly against fore and aft bodily movement, in all positions, by the links 15 and the cross head being connected with the axle it necessarily follows that the axle is rigidly braced against fore and aft movement but it is free to rise and fall.

It will be apparent therefore that I have provided a very simple highly efficient brace which will positively prevent any fore and aft movement of the end portion of the axle but will not in any way interfere with the vertical movement of that portion of the axle and, further, that this device is of a very strong durable character and that it can be quickly and easily installed on the machine without modification thereof.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a structure of the character described, the combination with a main frame, and an axle movable about a horizontal axis extending transversely thereto, of a brace for one end of said axle comprising a member connected with said end of said axle for vertical movement therewith, and means for holding said member against bodily movement in a direction transverse to said axle.

2. In a structure of the character described, the combination with a main frame, and an axle movable about a horizontal axis extending transversely thereto, of a member pivotally connected between its ends with said axle on an axis fixed with relation to said axle, and bars pivotally connected with the respective ends of said member, extending forwardly and rearwardly therefrom, respectively, and pivotally mounted at their front and rear ends on axes fixed with relation to said main frame.

3. In a structure of the character described, the combination with a main frame, and an axle movable about a horizontal axis extending transversely thereto, of a supporting structure mounted on said axle and extending beyond one end thereof, a vertically arranged cross head pivotally mounted between its ends on said structure, links extending forwardly and rearwardly, respectively, from the upper and lower ends of said cross head, each link being pivotally connected at one end to said cross head and mounted at its other end on an axis fixed with relation to said main frame.

4. In a structure of the character described, the combination with a main frame, and an axle movable about a horizontal axis extending transversely thereto, of a bracket rigidly secured to said axle near one end thereof and having a bore extending transversely to said axle, a bolt mounted in said bore and having a head at one end thereof, a cross head pivotally mounted between its ends on the head of said bolt, links pivotally connected with said cross head above and below the head of said bolt and extending respectively forwardly and rearwardly therefrom, said links being pivotally mounted at their other ends on axes fixed with relation to said main frame.

In testimony whereof, I affix my signature hereto.

BERLIN S. FERGUSON.